(12) United States Patent
Gregori et al.

(10) Patent No.: US 7,724,126 B2
(45) Date of Patent: May 25, 2010

(54) MOVABLE BARRIER OPERATOR OPERATING PARAMETER TRANSFER METHOD AND APPARATUS

(75) Inventors: Eric Gregori, Lindenhurst, IL (US); Robert S. Study, III, Arlington Heights, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1107 days.

(21) Appl. No.: 10/901,651

(22) Filed: Jul. 29, 2004

(65) Prior Publication Data
US 2006/0026520 A1    Feb. 2, 2006

(51) Int. Cl.
| | |
|---|---|
| B60R 25/00 | (2006.01) |
| G05B 19/00 | (2006.01) |
| G05B 13/02 | (2006.01) |
| G05B 19/18 | (2006.01) |
| G05B 9/02 | (2006.01) |
| G08C 19/00 | (2006.01) |
| H04B 1/00 | (2006.01) |
| H04L 9/14 | (2006.01) |
| H04L 9/32 | (2006.01) |
| G08B 1/08 | (2006.01) |
| G06F 11/00 | (2006.01) |

(52) U.S. Cl. .................. 340/5.7; 340/5.22; 340/539.14; 340/825.69; 340/825.72; 700/47; 700/65; 700/82; 714/6; 714/13

(58) Field of Classification Search ............... 340/825, 340/825.57, 825.62, 825.69, 825.71, 825.72, 340/500, 505, 5.22, 5.52, 5.2, 5.1, 5.21, 5.26, 340/5.7, 5.71, 531, 539.1, 539.14; 318/466, 318/468, 560, 565, 567, 568.1, 282; 714/1, 714/2, 3, 5, 6, 7, 10, 11, 12, 13; 702/34, 702/94, 95, 96, 97, 150; 700/47, 56, 61, 700/65, 79, 82, 245, 247, 248, 249, 260, 700/302; 709/225; 455/91, 418–420

See application file for complete search history.

(56) References Cited

U.S. PATENT DOCUMENTS

| | | | | |
|---|---|---|---|---|
| 4,811,197 A | * | 3/1989 | Wexler | 700/47 |
| 4,872,106 A | * | 10/1989 | Slater | 714/13 |
| 5,086,298 A | * | 2/1992 | Katsu et al. | 340/825.69 |
| 5,481,252 A | * | 1/1996 | Kwon et al. | 340/825.22 |

(Continued)

*Primary Examiner*—Crystal J Barnes-Bullock
(74) *Attorney, Agent, or Firm*—Fitch Even Tabin & Flannery

(57) ABSTRACT

Operating parameters as were previously learned by a first movable barrier operator (18) are transferred to a second movable barrier operator (10) such as, for example, to a replacement movable barrier operator. Pursuant to a preferred approach, such information transfer occurs via a receiver interface (13) that ordinarily serves to couple the movable barrier operator (10) to one or more remote user interfaces (11). Pursuant to one approach this transfer occurs during a learning mode of operation.

21 Claims, 3 Drawing Sheets

U.S. PATENT DOCUMENTS

| | | | |
|---|---|---|---|
| 6,196,467 B1 * | 3/2001 | Dushane et al. | 236/46 R |
| 6,303,063 B1 * | 10/2001 | Roberts et al. | 264/178 F |
| 6,671,633 B2 * | 12/2003 | Kramb et al. | 702/34 |
| 6,690,655 B1 * | 2/2004 | Miner et al. | 370/278 |
| 6,940,240 B2 * | 9/2005 | Kelkhoff et al. | 318/282 |
| 6,941,136 B2 * | 9/2005 | Study et al. | 455/419 |
| 6,975,203 B2 * | 12/2005 | Brookbank et al. | 340/5.26 |
| 7,034,488 B2 * | 4/2006 | Robb et al. | 318/468 |
| 7,066,297 B2 * | 6/2006 | Goodman et al. | 160/84.02 |
| 7,089,088 B2 * | 8/2006 | Terry et al. | 700/276 |
| 7,181,174 B2 * | 2/2007 | Fitzgibbon et al. | 455/91 |
| 7,224,275 B2 * | 5/2007 | Fitzgibbon | 340/539.26 |
| 7,327,249 B1 * | 2/2008 | Murray | 340/521 |
| 7,346,374 B2 * | 3/2008 | Witkowski et al. | 455/569.2 |
| 7,397,342 B2 * | 7/2008 | Mullet et al. | 340/5.22 |
| 7,463,132 B2 * | 12/2008 | Deng et al. | 340/5.2 |
| 7,600,550 B2 * | 10/2009 | Mays | 160/188 |
| 2003/0030540 A1 * | 2/2003 | Hom | 340/5.22 |
| 2003/0030541 A1 * | 2/2003 | Tokorotani | 340/5.52 |
| 2003/0033388 A1 * | 2/2003 | Hom et al. | 709/220 |
| 2004/0016244 A1 * | 1/2004 | Street et al. | 62/132 |
| 2007/0055776 A1 * | 3/2007 | Hom et al. | 709/225 |

* cited by examiner

MOVABLE BARRIER OPERATOR OPERATING PARAMETER TRANSFER METHOD AND APPARATUS

TECHNICAL FIELD

This invention relates generally to movable barrier operators and more particularly to operating parameters as are learned, stored, and/or used in conjunction therewith.

BACKGROUND

Movable barrier operators of various kinds are known in the art. Such operators typically serve to effect the selective and controlled movement of a corresponding movable barrier and/or a related mechanism (such as a door locking or latching mechanism). Various kinds of movable barriers are known, including but not limited to single panel and segmented garage doors, horizontally or vertically pivoting or sliding doors or gates, cross arms, rolling shutters, and the like. In general, such movable barriers are selectively moved as between two primary positions (usually a fully opened position and a fully closed position).

Such movable barrier operators typically interface to one or more remote user interfaces including both wired and wireless interfaces. Such remote user interfaces provide a given user the ability to control or at least influence the operation of the movable barrier operator with respect to movement of a corresponding movable barrier and/or other controlled functionality (such as operating state, lighting control, and so forth).

The operational complexity of such movable barrier operators continues to grow, driven at least in part by consumer need and request, in part by available technological drivers, and in part by proliferating specific requirements regarding safe and effective operation. For example, sophisticated and multi-faceted movable barrier position determination functionality often drives, in return, corresponding complicated learning modes of operation during which the movable barrier operator automatically (or partially automatically) establishes one or more operating parameters for itself based upon user input and/or the monitored results of one or more test behaviors and actions. As another example, such movable barrier operators sometimes comprise a multi-state platform sensitive to such things as a last-sensed position of the movable barrier, a last-sensed direction of movement, and so forth. To the extent that many movable barrier operators comprise partially or fully-programmable platforms, such operating parameters, however initially gleaned, often comprise one or more numerical or otherwise coded entities that are stored in memory and used by the movable barrier operator as needed.

From time to time it may be necessary to remove a first movable barrier operator (due to failure, unreliability, obsolescence, or the like) and to install a second movable barrier operator in its place. In some cases, such an action entails replacement of the complete system, including but not limited to the motive force and linkage apparatus that couples the movable barrier operator to the movable barrier. In other cases, only the movable barrier operator is replaced and other elements of the system are left in place. In either case, present practice typically requires treating the installation as constituting a completely new installation such that the new movable barrier operator must be conducted through its initial complete learning mode of operation prior to ordinary usage. This can be unduly time consuming, error prone, and can even lead to potentially mischievous scenarios.

At the same time system designers are significantly constrained by a need to assure a reasonable price point for any given movable barrier operator. This, in turn, tends to lead such designers away from incremental additional costs as may be necessitated by structural and/or component revisions or designs.

BRIEF DESCRIPTION OF THE DRAWINGS

The above needs are at least partially met through provision of the movable barrier operator operating parameter transfer method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

Generally speaking, pursuant to these various embodiments, one provides a movable barrier operator controller with at least one operating parameter as was previously learned by another movable barrier operator controller. The movable barrier operator controller then stores that operating parameter and uses that stored operating parameter during subsequent operations.

Depending upon the embodiment such operating parameters are so delivered via a present coupling between a replacement movable barrier operator and a movable barrier operator to be replaced. Or, if desired, an intermediary device can serve to first receive the operating parameters from the movable barrier operator to be replaced and to then later provide those operating parameters to the replacement movable barrier operator (for example, subsequent to decoupling the intermediary appliance from the movable barrier operator to be replaced).

Pursuant to a preferred approach, the operating parameters are delivered to the movable barrier operator via an existing interface, thereby obviating the need to provide a dedicated interface with its corresponding incremental cost. For example, an existing remote user interface, such as a wired remote user interface, can serve in this regard. So configured, such an interface can serve as an operating parameter conduit upon initial installation and later as a remote user interface during ordinary use.

So configured, a replacement movable barrier operator can be quickly calibrated with respect to a present serviceable installation without engaging in a corresponding present day learning mode of operation. This, in turn, can lead to a quicker installation while also leveraging historical information gleaned and developed by the movable barrier operator being replaced regarding the present installation. Such information can more quickly lead to satisfactory operation of the overall system while also potentially avoiding at least some circumstances of potential concern.

Figure 1:
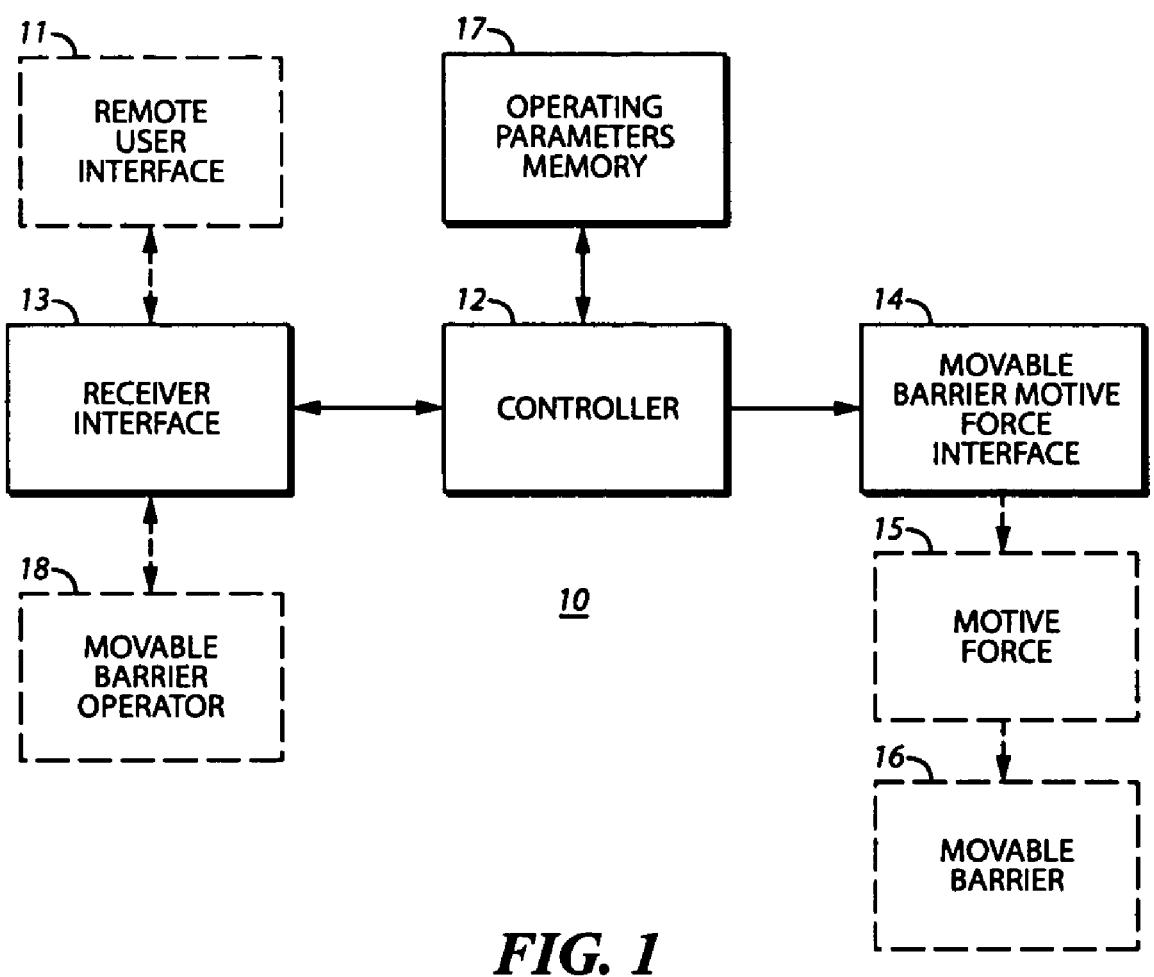
FIG. 1 comprises a block diagram as configured in accordance with various embodiments of the invention.

These and other benefits may become more evident upon making a thorough review and study of the following detailed description. Referring now to the drawings, and in particular to FIG. 1, an exemplary movable barrier operator 10 comprises a controller 12 that communicates with a remote user interface 11 via a receiver interface 13. The controller 12 serves to control the desired functionality of the movable barrier operator 10 and will typically operably couple to a movable barrier motive force interface 14 that in turn governs the operation of a motive force 15 (such as an electric motor) that effects selective movement of a corresponding movable barrier 16 (such as but not limited to a single panel or segmented garage door, a rolling or sliding gate, a horizontally or vertically pivoting door, a swinging arm guard, rolling shutters, a vertically dropping fire door, and the like). (Many movable barrier motive force interfaces and motive forces are generally well understood in the art and no doubt others will be developed in the future. Furthermore, the teachings set forth herein are not particularly sensitive to application or use of any particular such interface or force. For all these reasons, further elaboration and description regarding such interfaces and motive forces need not and will not be presented here.) In general, such a controller 12 comprises a partially or fully programmable platform that can be readily programmed to embody the teachings set forth herein though, if desired, such a controller 12 can comprise a fixed (or hard-wired) dedicated-purpose fixture.

The remote user interface 11 can comprise a wireless and/or a wired fixture as appropriate to the needs of a given application. The receiver interface 13 will of course preferably comprise an interface that is compatible with the remote user interface 11 to facilitate effective communications between the latter and the controller 12. In a preferred embodiment, the remote user interface 11 comprises a wired remote user interface (such as a wall-mounted user-accessible button (or buttons) or switch) and the receiver interface 13 comprises, for example, a serial bus. So configured, a user can provide one or more operational instructions to the controller 12 via the remote user interface 11 to thereby, for example, cause the movable barrier 16 to move from a first position (such as a fully closed position) to a second position (such as a fully opened position). Such configurations and capabilities are well understood in the art and require no further elaboration here.

In many cases the controller 12 will make use of one or more operating parameters. In such a case, these operating parameters are readily stored in one or more operating parameters memory 17. Those skilled in the art will readily appreciate that such a memory 17 can comprise a stand-alone discrete entity as suggested by FIG. 1 or can be partially or fully integrated with the controller 12. Such architectural options are well understood and require no further description here. These operating parameters can be many and varied to reflect the various operating strategies of various movable barrier operator systems.

Without intending to narrow the concept, operating parameters can include, but are not limited to:

identification information as corresponds to at least one specific remote user interface (including but not limited to static identifiers and to dynamic identifiers such as so-called rolling code-based identifiers);

movable barrier position determination information (as determined, for example, by various position-related or drive-related pulse generators);

movable barrier position limits information (as provided by any of a wide variety of stop and/or other limit detection devices);

movable barrier speed profile;

movable barrier maximum operating speed;

movable barrier passpoint information;

lighting control information; and movable barrier operational configuration information (including but not limited to next operation sequence information such as when the operator is stopped in mid-motion and a next programmed direction of travel under such conditions is specified as being towards a closed position, towards an opened postion, or in a direction that is the opposite of the last direction of movement.

Those skilled in the art will understand that such information will typically be stored in the memory 17 pursuant to a corresponding storage map. Such a storage map will typically correspond to a given movable barrier operator program version. Further information regarding storage maps appears below where appropriate. As will also be shown below in more detail, pursuant to at least some embodiments, the controller 12 can be arranged and programmed to use operating parameters information that has been stored in conformance with a storage map that differs from its own native storage map compatibility. This capability results, in a preferred embodiment, by configuring the controller 12 to effect a storage map translation when necessary to permit compatible use of non-native storage schemes.

Figure 2:
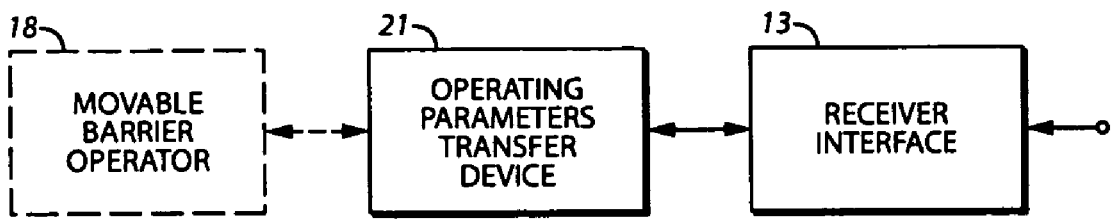
FIG. 2 comprises a detail block diagram as configured in accordance with various embodiments of the invention.

Pursuant to these embodiments, at least one of the operating parameters as stored in the operating parameters memory 17 and as used by the controller 12 comprises an operating parameter that was received from another movable barrier operator 18. Pursuant to one approach, such an operating parameter can be so stored by receiving the operating parameter from another movable barrier operator 18 via the receiver interface 13 (i.e., in a preferred approach, by connecting the movable barrier operator 18 to the controller 12 via a serial bus that is ordinarily used to couple the latter to the remote user interface 11). A less-direct approach can be employed if desired, of course. For example, and referring now to FIG. 2, a separate intermediary appliance, such as an operating parameters transfer device 21, can be coupled to a first movable barrier operator 18 to receive the operating parameters of interest. That intermediary appliance can then be separated from the first movable barrier operator 18 and coupled (via, for example, the receiver interface 13) to a second movable barrier operator 10 to permit the operating parameter(s) from the first movable barrier operator 18 to be transferred to and stored in the second movable operator 10.

Such an intermediary appliance can be relatively simple if desired, and comprise essentially a memory platform having suitable interfaces (such as a serial bus interface that will operate compatibly with the serial bus-based receiver interface of such movable barrier operators) and sufficient communication protocol capabilities to permit handling of the operating parameter information as described above. A user interface can also be provided to suit the requirements of a given application. For example, display indicia can be provided to indicate connection status, information uploading or downloading status, and the like.

Figure 3:
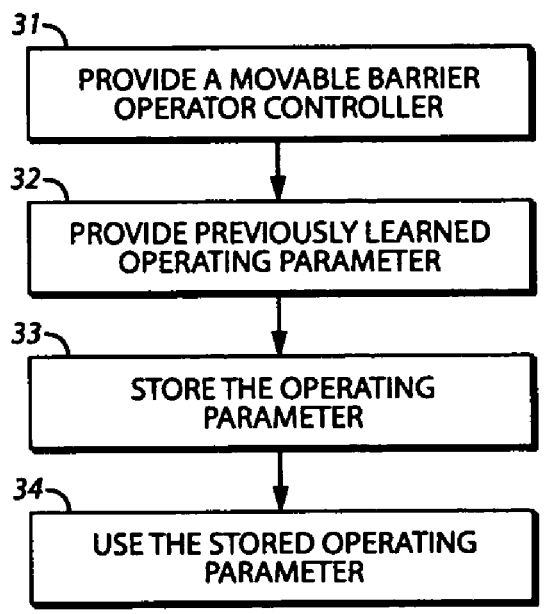
FIG. 3 comprises a flow diagram as configured in accordance with various embodiments of the invention.

The above described (or any other suitably programmed and/or configured platform) can be readily employed as follows. Referring now to FIG. 3, a preferred process 30 first provides 31 a movable barrier operator controller (such as, for example, the controller described above). The process 30 then provides 32 at least one operating parameter as was previously learned by a first movable barrier operator controller and stores 33 that operating parameter (or parameters) to provide a stored operating parameter (or parameters). This process 30 then effects usage 34 of the stored operating parameter (or parameters) by a second movable barrier operator controller.

Figure 4:
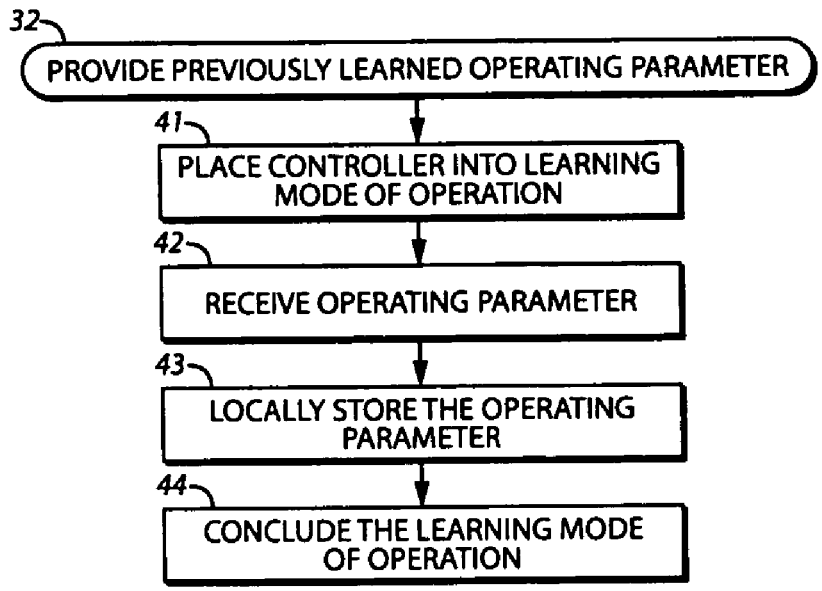
FIG. 4 comprises a flow diagram as configured in accordance with various embodiments of the invention.

There are various ways to effect provision 32 of such previously learned operating parameters. For example, and referring momentarily to FIG. 4, the second movable barrier operator controller can be placed 41 into a learning mode of operation by, for example, detecting at least a predetermined condition (such as by detecting a first application of enabling power to the movable barrier operator controller when first powering the controller up following initial installation and/ or as may occur pursuant to engaging in a signaling protocol (such as but not limited to a corresponding handshake protocol or the like) with the first movable barrier operator controller (or an intermediary appliance as described above)). The general use of a learning mode of operation in conjunction with a movable barrier operator comprises a well-understood capability though the prior art has not previously employed a learning mode of operation to essentially learn information that has already been previously learned.

Upon entering the learning mode of operation, this process 32 then provides for reception 42 of the operating parameter (or parameters) and at least local buffering and storage 43 of the received information. The learning mode of operation can then conclude 44.

So configured, a new movable barrier operator can be installed in place of a previously installed movable barrier operator. The previous platform may contain one or more operating parameters that continue to be relevant to operation with respect to the attendant motive force mechanism, the corresponding movable barrier, and/or other elements of the overall installation including but not limited to limit switch positioning, lighting configuration and user programming, remote user devices that are authorized to interact with the movable barrier operator, a present position of the movable barrier and/or a present appropriate or necessary operating state of the system, maximum applied force thresholds as correspond to present operating conditions, and so forth. Pursuant to these teachings, the replaced movable barrier operator can be operably coupled to the replacement movable barrier operator and a transfer of such operating parameters effected from the former to the latter. By such an approach, the replacement unit can be rendered fully operable more quickly and effectively (and renewed operation potentially rendered more safely) than is currently associated with such an activity.

Figure 5:
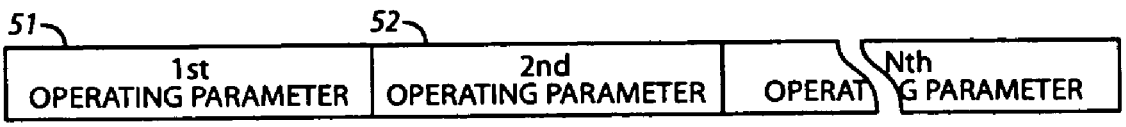
FIG. 5 comprises a first schematic memory map as configured in accordance with various embodiments of the invention.

As mentioned earlier, such operating parameters are often stored pursuant to a specific storage map with specific scale factors. As a simple schematic illustration, and referring now to FIG. 5, a first memory storage map 50 may provide for a first operating parameter 51 as used by a given movable barrier operator to be specifically mapped to and located at a specific memory location in a given memory. Similarly, a second operating parameter 52 may be specifically mapped to a different specific memory location in that same memory. Such a storage map 50 may correspond to a given movable barrier operator program version. For example, and for purposes of illustration, Version 2.0 of a given program as released by a given manufacturer might be correlated with such a storage map.

Figure 6:
FIG. 6 comprises a second schematic memory map as configured in accordance with various embodiments of the invention.

Referring now to FIG. 6, a later version of this same program (for example, Version 2.1 or Version 3.0) might correlate to a different storage map 61 wherein the second operating parameter 52 now occupies a memory location previously associated with the first operating parameter 51 and vice versa. In such a situation, a simple transference and potentially scaling of the operating parameters as were being retained in conformance with the first storage map 50 to a movable barrier operator that uses the later program version (and hence, in this illustrative example, a different storage map 61) does not, in and of itself, assure that the receiving movable barrier operator will be able to appropriately use the received information. With the simple illustration provided, for example, the receiving movable barrier operator may access the memory and access the first operating parameter 51 in error while trying instead to retrieve the second operating parameter 52.

Pursuant to one approach, when such a situation exists, the above described processes can be modified to permit identification of the program version (or some other useful indicator regarding the vintage or version of the storage map that is associated therewith) and to then translate and re-map those memory contents of the replaced movable barrier operator to storage positions that are consistent with the storage map of the replacement movable barrier operator. Pursuant to another approach, the operating parameters can be stored in a manner that conforms with their original storage map. The controller for the receiving movable barrier operator can then dynamically effect a storage map translation when accessing (or updating) such operating parameters to ensure that the correct information is being retrieved.

By these teachings, the task of replacing an existing movable barrier operator with a replacement platform can be greatly eased while further tending to ensure that operation of the replacement unit will proceed uneventfully and with minimum downtime due to a need to populate the replacement unit with useful operating parameters.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A movable barrier operator which operably communicates with at least one remote user interface, which remote user interface has at least one user-accessible button or switch which during ordinary use permits a user to assert the button or switch to cause a movable barrier to presently move from a first position to a second position, the movable barrier operator comprising:
    a movable barrier motive force interface;
    a data bus that permits the movable barrier operator to communicate with the at least one remote user interface;
    an operating parameters memory having at least one operating parameter stored therein that was received from another and different movable barrier operator via the data bus;
    a controller that is operably coupled to the operating parameters memory and having an input operably coupled to the data bus and an output operably coupled to the movable barrier motive force interface,
    the at least one operating parameter that is received from the another and different movable barrier operator and stored in the operating parameters memory is used by the movable barrier operator.

2. The movable barrier operator of claim 1 wherein the at least one operating parameter comprises at least one of:
    identification information as corresponds to at least one specific remote user interface;
    movable barrier position determination information;
    movable barrier position limits information;
    movable barrier speed profile;

movable barrier maximum operating speed;
movable barrier passpoint information;
lighting control information
movable barrier operational configuration information.

3. The movable barrier operator of claim 1 wherein the data bus comprises a serial bus.

4. The movable barrier operator of claim 1 wherein the at least one operating parameter is stored in the operating parameters memory in accord with a first storage map as corresponds to a first movable barrier operator program version.

5. The movable barrier operator of claim 4 wherein the controller uses a second movable barrier operator program version that is different from the first movable barrier operator program version.

6. The movable barrier operator of claim 5 wherein the controller further comprises storage map translation means for facilitating use of the at least one operating parameter by the controller notwithstanding a difference between the first and second program versions.

7. A method comprising:
learning at least one operating parameter at a first movable barrier operator;
transmitting the at least one operating parameter from the first movable barrier operator to a second movable barrier operator via a data bus, the data bus being coupled to and permitting the second movable barrier operator to communicate with at least one remote user interface;
receiving and storing the at least one operating parameter at the second movable barrier operator;
using the stored at least one operating parameter at the second movable barrier operator
entering door movement commands via at least one user-accessible button or switch at the remote user interface and which remote user interface during ordinary use permits a user to cause the second movable barrier operator to move a barrier from a first position to a second position.

8. The method of claim 7 wherein the at least one operating parameter comprises at least one of:
identification information as corresponds to at least one specific remote user interface;
movable barrier position determination information;
movable barrier position limits information;
movable barrier speed profile;
movable barrier maximum operating speed;
movable barrier passpoint information;
lighting control information;
movable barrier operational configuration information.

9. The method of claim 7 wherein providing at least one operating parameter as was previously learned by the first movable barrier operator controller further comprises:
placing the second movable barrier operator into a learning mode of operation;
receiving the at least one operating parameter;
locally storing the at least one operating parameter;
concluding the learning mode of operation.

10. The method of claim 9 wherein placing the second movable barrier operator into a learning mode of operation further comprises detecting at least a first predetermined condition.

11. The method of claim 10 wherein detecting at least a first predetermined condition further comprises:
detecting application of enabling power to the second movable barrier operator;
engaging in a signaling protocol with the first movable barrier operator.

12. The method of claim 11 wherein engaging in a signaling protocol further comprises engaging in a handshake protocol.

13. The method of claim 7 wherein storing the at least one operating parameter to provide a stored operating parameter further comprises storing the at least one operating parameter using a first memory storage map.

14. The method of claim 13 wherein the first memory storage map corresponds to a first version of movable barrier operator controller programming.

15. The method of claim 14 wherein the second movable barrier operator uses a second version of movable barrier operator controller programming that is different than the first version of movable barrier operator controller programming.

16. The method of claim 15 wherein using the stored operating parameter by the second movable barrier operator further comprises translating the first memory storage map to thereby facilitate compatible use of the at least one operating parameter by the second movable barrier operator.

17. A method of transferring operational data from a moveable barrier operator which has been used and has operational data stored therein to a second moveable barrier operator, the second moveable barrier operator configured to operably communicate with at least one remote user interface which has at least one user accessible button or switch which permits a user to cause the new moveable barrier to move from a first position to a second position, the method comprising:
communicating the operational data from the moveable barrier operation which has the operational data stored therein to the second moveable barrier operator through a data bus; and
receiving the communicated operational data at the second moveable barrier operator; and
storing the communicated operational data in a memory in the second barrier operator, the second barrier operator configured to communicate with the at least one remote interface through the data bus and use the operational data communicated through the data bus.

18. The method of claim 17 wherein the second moveable barrier operator is a replacement for the moveable barrier operator.

19. A movable barrier operator comprising:
a controller;
a receiver interface which communicates with the controller and is configured to communicate with at least one remote user interface which permits a user to cause the moveable barrier operator to move a movable barrier from a first position to a second position;
a movable barrier motive force interface which is operably connected to a motor which moves the barrier and the controller in operable communication with the movable barrier motive force interface; and
operating parameter memory which receives and stores data from another moveable barrier operator via the receiver interface, the data from the other moveable barrier operator concerning the operation of the barrier and the controller operably connected to the memory to effect control of the moveable barrier operator and to move the barrier.

20. The moveable barrier operator of claim 19 wherein the receiver interface includes a data bus configured to communicate with the at least one remote user interface.

21. The moveable barrier operator of claim 20 wherein the controller has an input operably coupled to the data bus and an output operably coupled to the movable barrier motive force interface.

* * * * *